US012572704B2

(12) United States Patent
Racz

(10) Patent No.: US 12,572,704 B2
(45) Date of Patent: Mar. 10, 2026

(54) SMART CARD AUTHENTICATION SYSTEM

(71) Applicant: GENETEC INC., St-Laurent (CA)

(72) Inventor: Pierre Racz, Montreal (CA)

( * ) Notice: Subject to any disclaimer, the term of this patent is extended or adjusted under 35 U.S.C. 154(b) by 127 days.

(21) Appl. No.: 18/654,665

(22) Filed: May 3, 2024

(65) Prior Publication Data

US 2025/0141688 A1 May 1, 2025

Related U.S. Application Data

(60) Provisional application No. 63/594,276, filed on Oct. 30, 2023.

(51) Int. Cl.
*G06F 21/77* (2013.01)
*H04L 9/32* (2006.01)

(52) U.S. Cl.
CPC ............ *G06F 21/77* (2013.01); *H04L 9/3234* (2013.01); *H04L 9/3268* (2013.01); *H04L 9/3271* (2013.01)

(58) Field of Classification Search
CPC ....................................... G06F 21/77
See application file for complete search history.

(56) References Cited

U.S. PATENT DOCUMENTS

| | | | |
|---|---|---|---|
| 7,900,045 | B2 | 3/2011 | Rager et al. |
| 8,190,127 | B2 | 5/2012 | Cofita |
| 8,621,602 | B2 | 12/2013 | Rijnswou Van et al. |
| 8,782,396 | B2 | 7/2014 | Ziola et al. |
| 8,856,528 | B2 | 10/2014 | Schrix et al. |
| 9,281,945 | B2 | 3/2016 | Voice et al. |
| 10,965,474 | B1 | 3/2021 | Benson et al. |

| | | | | |
|---|---|---|---|---|
| 2003/0231103 | A1 | 12/2003 | Fisher | |
| 2004/0050930 | A1* | 3/2004 | Rowe ..................... | G07C 9/257 235/492 |
| 2004/0088562 | A1* | 5/2004 | Vassilev ............ | G06Q 20/3552 726/20 |
| 2007/0043954 | A1 | 2/2007 | Fox | |
| 2007/0187493 | A1* | 8/2007 | Hong .................. | G06Q 20/341 235/382 |
| 2007/0226497 | A1 | 9/2007 | Taylor | |
| 2010/0071031 | A1* | 3/2010 | Carter .................... | G06F 21/32 726/2 |
| 2010/0096452 | A1 | 4/2010 | Habraken | |
| 2020/0005298 | A1 | 1/2020 | Hiura et al. | |
| 2022/0311627 | A1 | 9/2022 | Osborn et al. | |

FOREIGN PATENT DOCUMENTS

| | | |
|---|---|---|
| CN | 112787813 A | 5/2021 |
| GB | 2353620 A | 2/2001 |
| WO | 2016/031607 A1 | 3/2016 |

OTHER PUBLICATIONS

Extended European search report dated Mar. 20, 2025 in the Corresponding European application No. 24207016.7.

* cited by examiner

*Primary Examiner* — Bradley W Holder
(74) *Attorney, Agent, or Firm* — Anglehart et al.

(57) ABSTRACT

Systems and methods for key card authentication are provided. The system may involve multiple simple key card readers connected to a central, local device over a shared data bus. A key card reader may receive an identifier from the key card and transmit it to a local device. The local device may generate a challenge/response pair and send it to the key card reader. The key card reader challenges the key card and determines whether the key card's response matches the expected response. The system uses minimal bandwidth on the shared data bus network.

20 Claims, 11 Drawing Sheets

SMART CARD AUTHENTICATION SYSTEM

TECHNICAL FIELD

The current disclosure relates to security systems for authenticating personnel, and more specifically to smart cards and smart card readers.

BACKGROUND

The use of smart cards to govern access to guarded assets is well known in the art. An organization can provide personnel each with their own smart card, which can be used to unlock doors to buildings, unlock access to computers, etc. This prevents unauthorized personnel from having access to expensive equipment or sensitive information.

To provide access to a user, smart cards must be authenticated. Many authentication approaches exist, including ones in which cryptographic techniques are used, such as asymmetric encryption. In some such implementations, the smart card will provide its identifier. The card reader will generate a random sequence of bits, use the public key associated with the identifier to encrypt the sequence, and provide the encrypted sequence as a challenge to the card. The card will then use its private key to decrypt the challenge and provide the decrypted sequence to the key card reader. If the decrypted sequence is the same as the original sequence, the card is authenticated. The card reader may send a signal to an actuator to, for example, unlock a door, allowing the smart card holder to enter a building.

There are generally two ways to set up the system. In a first case, the smart card reader may communicate with a server or database during the authentication process. In these situations, the card reader (a low-functionality card reader) may merely act as an intermediary between the smart card, and the server or database that generates the random sequence and the challenge, and that verifies the decrypted message. Conventionally, multiple card readers will be connected via one data bus to the database.

In a second case, the smart card reader may have all the hardware necessary to authenticate smart cards without requiring assistance from a server or database. Such a key card reader (a high-functionality card reader) would require significant memory for storing information about all users (e.g., ID's and public keys) that have access to the asset that the reader is guarding and have significant processing power to perform cryptographic functions for generating the encrypted challenge.

In a conventional system, a number of smart card readers (or badge readers) are located at various doors of a building. While it is possible to connect each reader to the Internet and to a local door actuator, the conventional installation is to have each reader connected to an RS-485 bus shared by many devices that are connected to a local control unit. This can impose a limitation on the speed at which data can be communicated between the reader and other devices.

SUMMARY

Applicant has discovered a way to greatly improve network communications in a system of low-functionality card readers, empowering the low-functionality card readers to perform comparably to high-functionality readers. This may reduce the cost of building or upgrading a system. Applicant discloses a system using smart card readers with very little memory and processing capabilities, connected to a local device which authenticates cards and provides cryptographic functionality. By greatly reducing the size of the messages transmitted between the key card reader and the local device required to authenticate the smart card, the speed of the network is greatly improved, allowing the low-functionality card readers to function seamlessly on larger networks. This is done by changing the conventional structure of authentication, which will be described below.

In some examples, there is provided a key card reader having a card communications interface, a network communication interface, a memory, and a processor operatively connected to the memory. The processor can be configured to receive from said card communications interface an identifier of a key card to be authenticated, transmit the identifier to a local device over said shared data bus interface, receive, over the shared data bus, a challenge/expected response pair specific to the key card to be authenticated, and from that pair identify a challenge and an expected response, transmit the challenge to the key card over said card communications interface, receive a response from the key card over said card communications interface, determine whether the response corresponds to the expected response, and sending a signal to an actuator to grant access to a guarded asset on the basis of the response being equal/equivalent/corresponding to the expected response and of an entity associated with the key card being found to have access to the guarded asset.

The network communication interface may be a shared data bus interface. The key card reader may further comprising a number pad, and the processor may be additionally configured to receive a code from the number pad, to transmit the code to the card to be authenticated, and in response to the transmission of the code to receive the identifier of the key card to be identified. The processor may further be configured to communicate with an access control system to find whether an entity associated with the key card has access to the guarded asset.

In some examples, there is provided a key card authentication system, the system comprising at least one key card reader, and a local device, comprising information for determining a public key of a key card based on an identifier of a key card. The at least one key card reader can be each configured to receive an identifier of a key card to be authenticated, transmit, via the shared data bus, the ID of the key card to be authenticated to a local device, receive, via the shared data bus, a challenge/expected response pair, and from that pair identify a challenge and an expected response, transmit the challenge to the key card, receive a response from the key card, and determine whether the response is equal to the expected response. The local device can be configured to receive, via the shared data bus, the identifier of the key card to be authenticated, determine a public key of the key card to be authenticated based on the ID of the key card to be authenticated, generate a random sequence, encrypt the random sequence, generating an encrypted random sequence, using the public key of the key card to be authenticated to generate a challenge, and transmit, via the shared data bus, a challenge/expected response pair to the key card reader, wherein the challenge is the encrypted random sequence and the expected response is the random sequence. The identifier of a key card may be significantly smaller in size than the public key of a key card.

The system may further comprise a shared data bus for connecting all of the at least one key card reader to the local device. The at least one key card reader may further be configured to receive an external factor of authentication from an entity holding the key card to be authenticated and transmit the factor of authentication to the card for validation before receiving the identifier from the card. The key card reader may further be configured to, if the response is equal to the expected response, determine whether an entity associated with the card to be authenticated has access to a guarded asset. At least one of the key card reader or the local device may further be configured to record all communications in the system. The local device may further be configured to, prior to generating the random sequence, determine whether the card to be authenticated is expired.

In some examples, there is provided a method of authenticating key cards using minimal bandwidth. The method may comprise receiving, at a key card reader, an identifier of a key card presented to the key card reader for authentication, transmitting, from the key card reader, the identifier to a local device, determining, at the local device, the public key of the key card based on the identifier, generating, at the local device, a random sequence, generating, at the local device, a challenge/expected response pair, the challenge being the random sequence encrypted using the public key, and the expected response being the random sequence, transmitting, from the local device, the challenge/expected response pair to the key card reader, transmitting, from the key card reader to the key card, the challenge, receiving, at the key card reader, a response from the key card, and determining whether the response matches the expected response.

The communications between the key card reader and the local device may occur over a shared data bus. The method may be used to authenticate an identity, and the method may further comprise determining whether the authenticated user has access. The method may further comprise communicating to the local device the success or failure of the authentication.

In some examples, there is provided a backend key card security device, comprising a memory containing at least identifier, public key, private key and access information of all security cards in a security network, a network interface connected for receiving and sending information from and to a number of security card readers, and a processor. The processor can be configured to receive an identifier of a security card to be authenticated from a security card reader, determine a public key associated with the identifier stored in the memory, generate a random sequence, the random sequence forming an expected response, encrypt the random sequence using the public key associated with the identifier, forming a challenge, the challenge and expected response forming a challenge/response pair, and send the challenge/response pair, as one communication, to the security card reader.

The network interface may be a shared data bus interface, and the information provided to and from the number of security card readers may be transmitted over the shared data bus. The device may be further connected to an identifier database and an access database, and wherein the processor is configured to determine, in response to a communication from the security card reader that authentication is successful, using information in the access database, whether the security card to be authenticated has access to a guarded asset, and sends the result of the determination to the security card reader.

In some examples, there is provided a key card reader comprising a card communications interface, a data interface, a memory, and a processor operatively connected to the memory. The processor may be configured to receive from said card communications interface an identifier of a key card to be authenticated, transmit the identifier to a local device over the data interface, receive, from the data interface, a certificate (or encryption key) corresponding to the card, prepare a challenge using the certificate, send the challenge to the key card over the data interface, receive a response from they key card, determine whether the response corresponds to an expected response, and communicate with an access controller for access control authorization when the response corresponds to the expected response.

The access controller may be an access control system, the processor may further be configured to handle access authorization communication with the key card using an access control certificate received from the access control system. The access control system is implemented at least in part by the local device.

BRIEF DESCRIPTION OF THE DRAWINGS

The invention will be better understood by way of the following detailed description of embodiments of the invention with reference to the appended drawings, in which.

DETAILED DESCRIPTION

The present disclosure relates to smart card authentication systems, namely smart card readers. Smart card and key card are used interchangeably, and are intended to encompass contact and non-contact smart cards or other forms of tokens.

For the purposes of the present application, high-functionality (interchangeable with high-complexity or complex) key card readers (interchangeable with card readers) means a card reading system with significant processing and memory capabilities, usually capable of storing a significant amount of data relating to the number of cards, the ownership of the cards, the access to the card, and capable of performing certain processing functions such as cryptographic functions. For the purposes of the present application, low-functionality (interchangeable with low-complexity or simple) key card readers (interchangeable with card readers) means a card reading system without significant processing and memory capabilities, usually capable of only acting as a middle-man, communicating information between the card being read and some backend system such as a server or access control system.

As described above, conventional key reading systems encounter certain issues when an organization wishes to increase the number of key card readers. Conventional key card security systems are shown in FIGS. 1A-D.

Figures 1A, 1B:
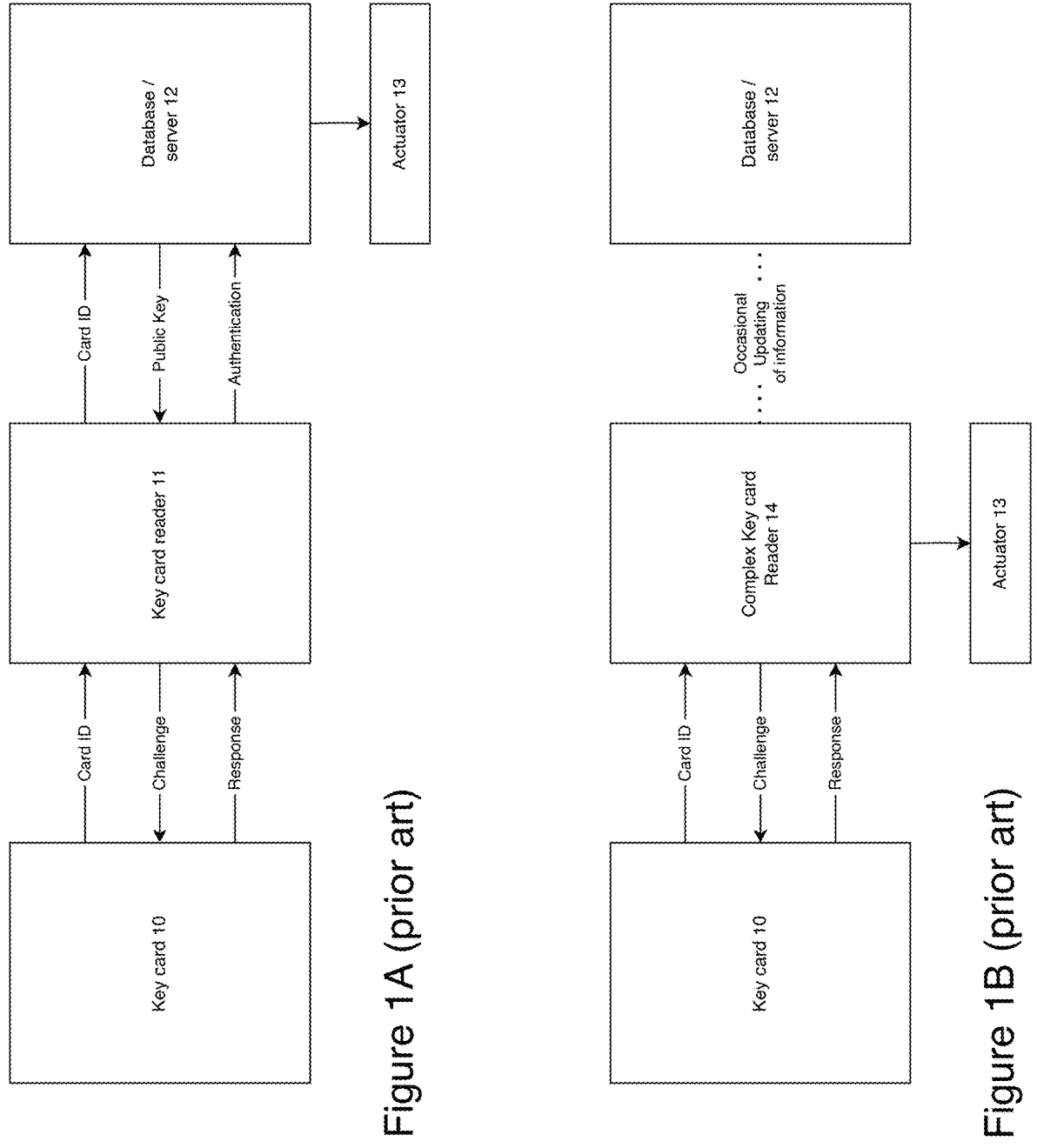
FIGS. 1A-1D are the schematic block diagrams exemplifying conventional systems and the issues faced by those systems (prior art).
Figure 1C:
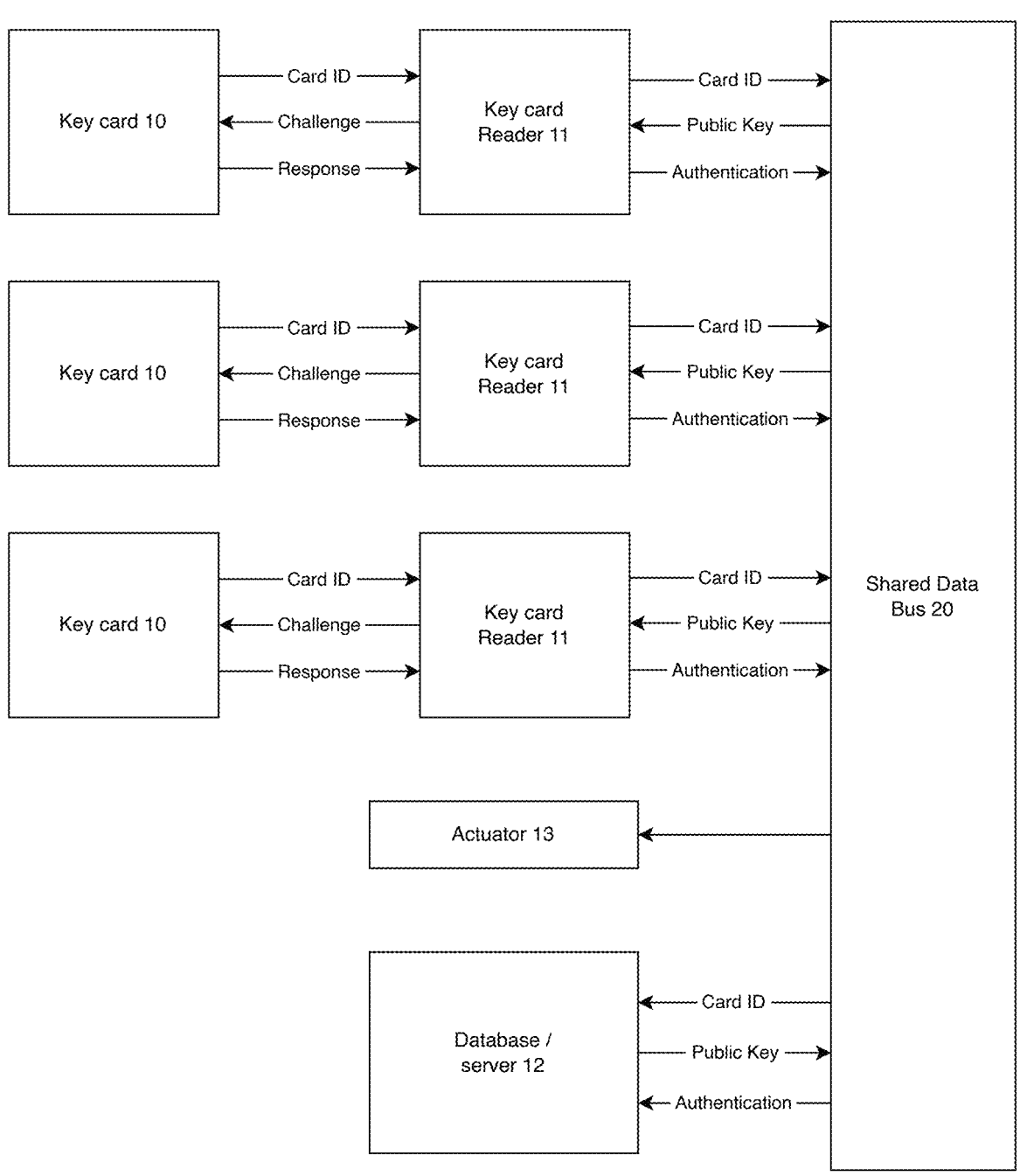

FIGS. 1A and 1C show one existing embodiment using low-functionality key card readers. A key card 10 is presented to a key card reader 11 and provides the key card reader 11 with its identifier. The key card reader 11 sends the identifier to a database or a server 12 that performs authentication. The database or server will use the received identifier to look up the card's corresponding public key to encrypt a randomly generated number with the public key. The encrypted result forms a challenge, which the database or server 12 sends back through the key card reader 11 to the key card 10. The key card 10 then uses its private key to decrypt the challenge, and sends the decrypted message (the response) back to the database or server 12 via the key card reader 11. The database or server may then connect to an actuator that provides the key card holder with access to the asset if authentication is successful, such as a door actuator that opens a locked door. This connection can be direct to the actuator, direct through a local controller, or indirect through the reader that can then signal the actuator or a local controller connected to the actuator.

FIG. 1C exemplifies the problem faced by this system. Various key card readers 11 are using a shared data bus 20 to communicate with the database or server 12. Due to the number and size of communications, especially the large size of the public key, the shared data bus 20 may experience latency or loss of messages if multiple key card readers 11 send communications concurrently.

The public key is generally a size of around 2048 bits, which is a significant size for many conventional shared data buses 20, though depending on the implementation, the public key may be of a different length or size.

Figure 1D:
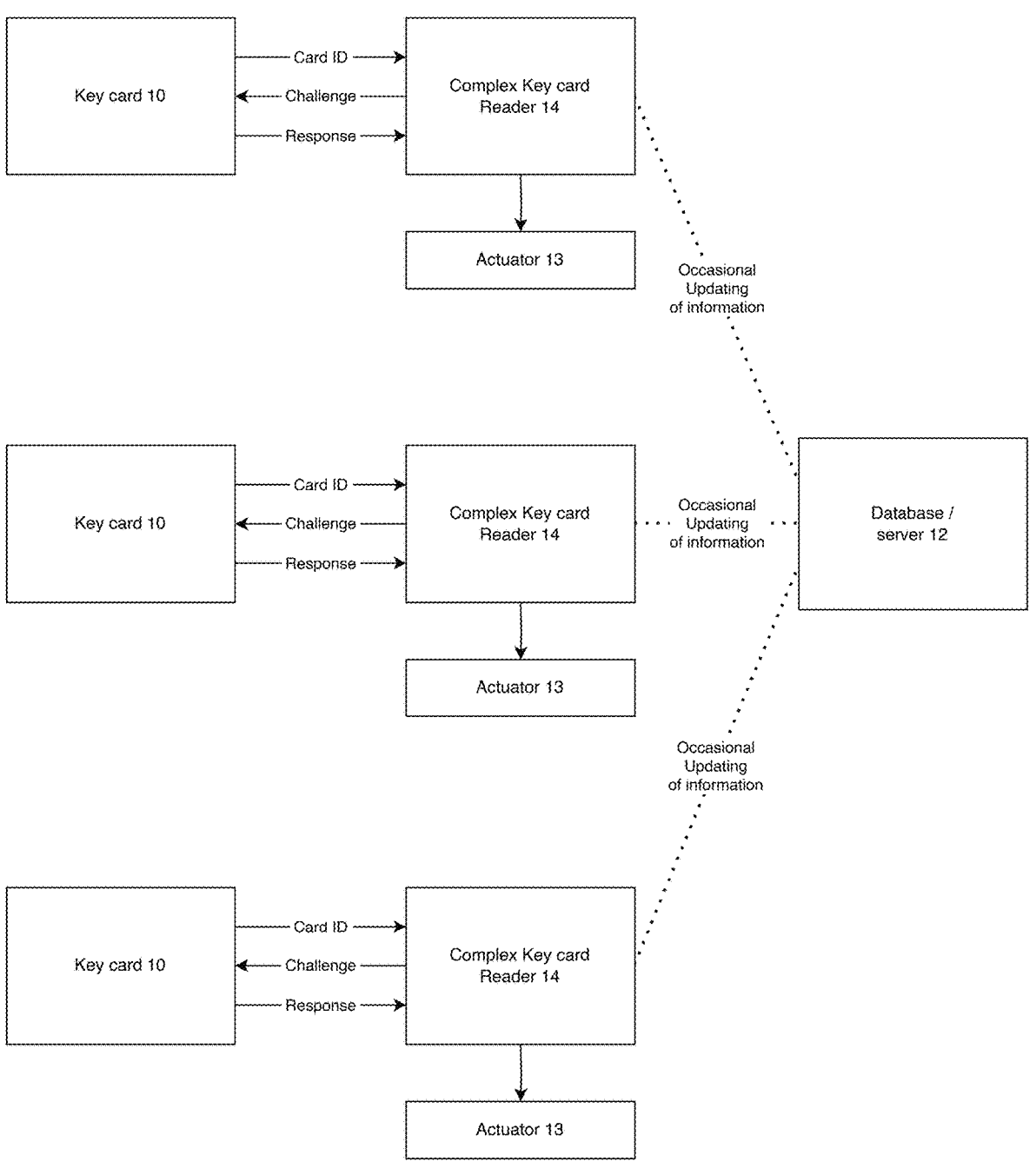

FIGS. 1B and 1D show high-functionality key card readers. A key card 10 is presented to a high-functionality key card reader 14 and provides the key card reader 14 with its identifier. The complex key card reader 14, having a large memory store and a processor capable of executing cryptographic functions, retrieved the public key corresponding to the card identifier from its memory store to encrypt a randomly generated number that forms a challenge. The challenge is sent back to the key card 10, which uses its private key to decrypt the challenge and sends the decrypted message as a response to the complex key card reader 14. The high-functionality key card reader 14 may determine whether the response matches the expected response (i.e., if the response is the original randomly generated number) and then determine if authentication is successful. If authentication is successful, it may signal to an actuator 13 (or to a local controller connected to the actuator 13) to allow the card holder access to the guarded asset.

Occasionally, the high-functionality key card reader 14 may communicate with a database or server 12 to update its memory and/or processing functions.

As seen in FIG. 1D, the use of high-functionality key card readers 14 does not lead to the problem of a crowded shared data bus, however, the cost of the high-functionality key card readers 14 is significantly more than the simple key card readers. High-functionality key card readers may also come with additional disadvantages or limitations, such as having their own custom operating system and programs that require adaptation to or from other parts of a company's security strategy.

Applicant has developed a system that uses the low-functionality, simple key card readers in a way that reduces the amount of data being sent over the shared data bus. The reduction of data being sent over the shared bus leads to a decrease in latency, improving the responsiveness of the various key card readers connected to the system and potentially decreasing security risks arising from long communication times. Additionally, not only can the system be built using simple key card readers, the methods and systems described herein can be used to upgrade existing systems using low-functionality card readers with minimal cost. Existing low-functionality card readers need not be replaced and thrown out.

Figure 2A:
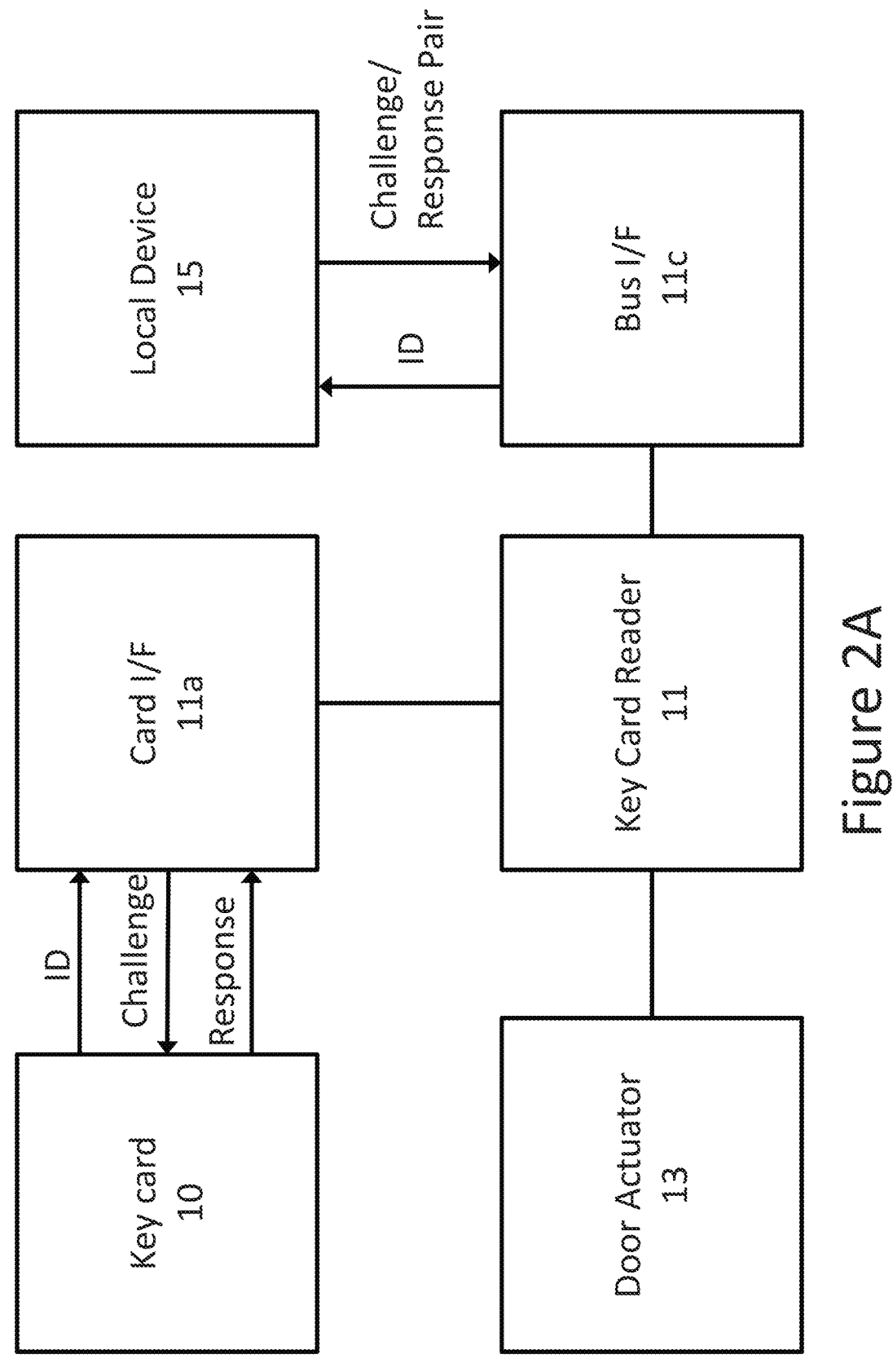
FIGS. 2A-2B are the schematic block diagrams of a first embodiment of the improved system.
Figure 2B:
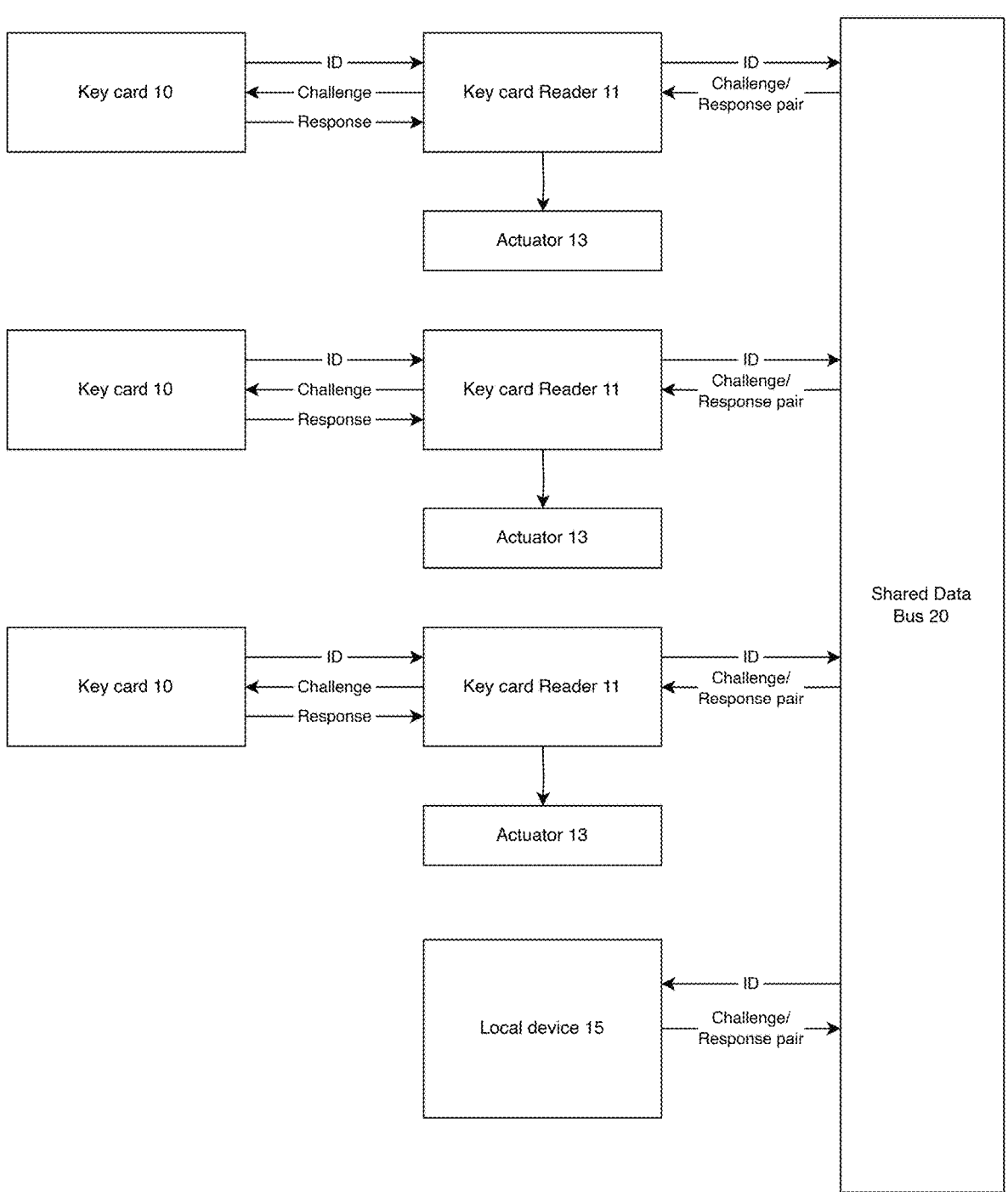

FIGS. 2A and 2B show an exemplary embodiment of a system that is capable of overcoming the drawbacks of the conventional methods by using inexpensive, simple key card readers in a way that reduces the amount of data being sent over the shared data bus.

The card reader 11 may have an RF card reader interface 11*a* and a shared data bus interface 11*c*. Typically, the card reader is implemented using a microcontroller providing a processor and memory for storing processor instructions, with the microcontroller connected to the card interface 11*a* and the bus interface 11*c*, either as separate components or integrated within the microcontroller (the RF coil or physical card connector being a separate component).

When a key card 10 is presented to a low-functionality key card reader 11, it would be possible to have the reader 11 communicate over the shared data bus 20 with a local device 15 while having the reader handle the authentication. This would involve the reader 11 receiving the public key for the presented card from the local device 15 over the bus 20, which key can be significantly long (e.g., where 2048 bits is preferred over 1024 bits). In the example, reader 11 may send an identifier (ID) number. This ID number may not be used for any cryptographic purposes and thus may be as short as desired. In the exemplary embodiment, the ID number has 32 bits, and even at 64 bits, it is significantly shorter than the public key. The ID number can be saved in the key card. The key card reader 11 may then send the ID number to a local device 15 over the shared data bus 20. The local device 15 may be a microserver or other computing device with significant memory and processing capabilities, including information that allows it to determine the public key of the key card 10 based on the ID number. This information may be, for example, in the form of a table that associates all known key card IDs to their known public keys. The local device 15 may then generate a random number of a desired length, encrypt the random number using the public key and transmit the encrypted number (the challenge) and the random number (the expected response) to the key card reader 11. Together, the challenge and expected response form a challenge/response pair.

Similarly to the ID number, the size/length of the challenge/response pair may be varied. However, in an exemplary embodiment, the challenge may be, without limitation, 64, 128 or 256 bits, and the response may be 64, 128 or 256 bits, and thus the challenge/response pair may be of 128, 256 or 512 bits in size.

The key card reader 11 may have minimal processing capabilities capable of receiving a challenge/response pair and being able to determine that one is a challenge and one is the expected response. This can be as simple as a digital comparator. In situations where the challenge/response pair are sent as one data packet or one message, the key card reader's 11 minimal processing capabilities may be capable of separating the message into the challenge and expected response.

The key card reader 11 may then send the challenge (but not the expected response) to the key card 10. The key card 10 may use its private key to decrypt the challenge and send the decrypted challenge to the key card reader 11 as a response. The key card reader 11 and may then determine whether the response is equal to the expected response. If so, it may signal to an actuator 13 to allow the card holder access to the guarded asset. This signal to the actuator can be sent over the bus 20 or another signal path.

In some embodiments, successful encryption of the challenge by the key card 10 is dependent on the card holder of the key card 10 inputting a personal identification number (PIN), providing biometrics information, or the like. For example, the private key of the key card 10 may be inaccessible until the card holder successfully enters a PIN, for instance via a keypad or similar input device of the key card reader 11. By way of another example, the private key of the key card 10 may be inaccessible until the card holder provides satisfactory biometrics data to a relevant sensor of the key card reader 11. Thus, if the card holder fails to provide the correct PIN or biometrics data, the private key of the key card 10 may remain locked, and thus unavailable to perform encryption of the challenge received from the key card reader 11. This may result in a failure to authenticate the identity of the card holder.

In some embodiments, the local device 15 may be a server or a database.

As can be seen from the examples described herein, the minimum size of the communications between the key card reader 11 and the local device 15 has been greatly reduced. Conventional systems (see FIG. 1C) may require at least a communication of around 2048 (public key)+32 bits for the ID. The system described herein may effect the necessary communications using only 32 (ID)+256 (challenge/response pair)=288 bits, amounting to a 7-fold reduction. This would allow an organization to have about 7 times the number of key card readers before they experience communication issues over the shared data bus. Additionally, the minimum frequency of the communications between the key card reader 11 and local device 15 is reduced. As can be seen by comparing FIGS. 1C to 2B, there may be 3 communications in the conventional system whereas the improved system may have only 2 communications, as the challenge/response pair can be sent as one data packet. This too may lighten the load on the data bus. These improvements are significant for data bus systems with very limited bandwidth. Many organizations may also have older data bus systems that are expensive to upgrade or replace, and thus, the opportunity to reduce the bandwidth used by their data bus (while keeping all the necessary functionality) may be beneficial.

In a preferred embodiment, the challenge/response pair (containing the expected response and the challenge) are sent as one message, or in one command or communication. This may involve sending it within the same packet. Sending the challenge/response pair as one message reduces the number of communications required by the system, thus increasing the system's efficiency, and possibly reducing the risk of the message being intercepted or lost.

In a preferred embodiment, the challenge/response pair generated by the local device is card-specific, that is, that only the particular card having the ID received by the local device (or having the public key identified by the local device using the received ID) would be able to decode it.

Moreover, the functionality of the card reader (and thus its cost) is kept to a minimum. The card reader need only be configured to temporarily store short messages (the challenge/response pair) and perform basic functions such as checking if the response is equal to the expected response or sending messages to the local device.

The system may also allow for organizations that already have a network of key card readers to adapt to the system without needing to replace their existing key card readers and data bus network. Depending on the state of the existing network, only relatively minimal changes may be required. For instance, installation of the local and updating of the firmware of the key card readers may suffice enable implementation of the techniques described above.

In some embodiments, there may be additional communications between the various elements shown. For example, it may be desirable in some embodiments for the key card reader 11 to provide a short communication to the local device 15 that the key card 10 has been successfully authenticated. Thus, it would allow the local device 15 to keep track of or log which card holders are authenticated at what times and at which key card readers, for instance for auditing purposes.

Figure 3A:
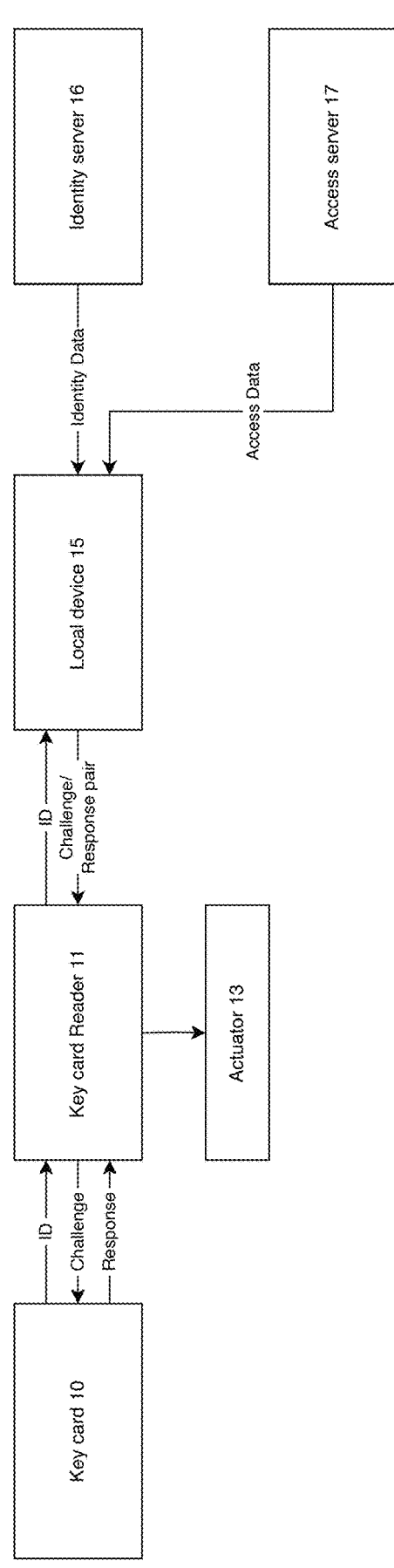
FIGS. 3A-3B are the schematic block diagrams of a second embodiment of the improved system.
Figure 3B:
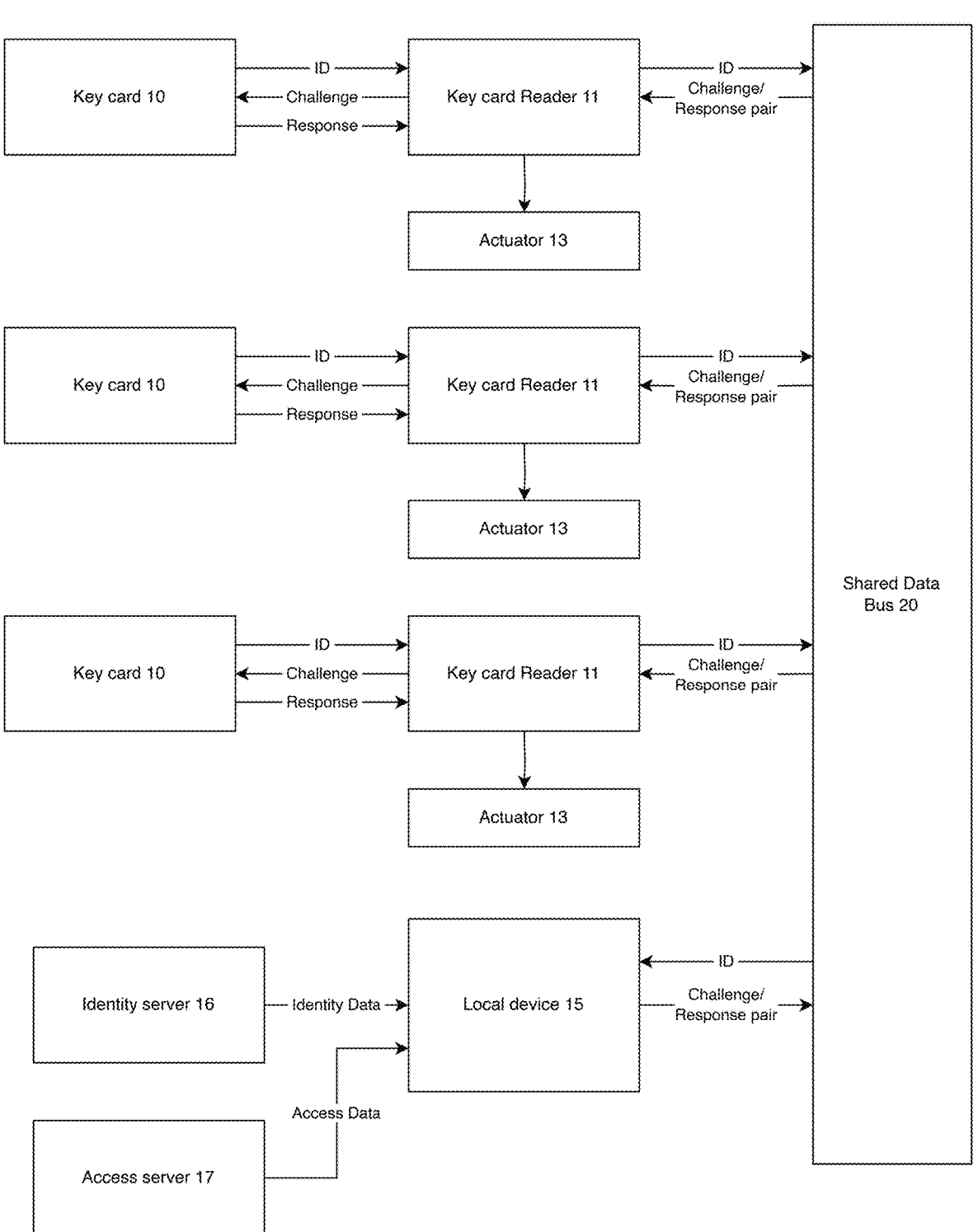

FIGS. 3A and 3B show a second exemplary embodiment of the improved system. The embodiment is generally similar to the embodiment of FIGS. 2A and 2B, however, there is the inclusion of the identity server 16 and the access server 17, which update the local device 15 with identity data and access data, respectively.

The separation of identity data and access data allows the system to keep track not only of which users have access to a guarded asset, but to determine which users are accessing which assets at any given time. Thus, the improved system may perform more than one authentication to determine, separately, the identity of the card holder and whether that card holder has access to the guarded asset.

The separate determination of identity and access can be implemented in various ways. In one embodiment, the local device 15 will determine whether the holder of the received ID (whether they will be authenticated or not) has access to the guarded asset. If the holder does not, the local device may then send a short signal to the key card reader to deny access without needing to authenticate the card holder. Alternatively, it may be desirable to authenticate the card holder to determine if there is an imposter trying to imitate a user's ID. The local device may thus still generate a challenge/response pair and send it to the key card reader along with a short instruction to not allow access to the user, no matter the outcome of authentication. The key card reader may return a short message to the local device, informing it of whether the authentication was successful or not, and confirming that access was not granted.

In another embodiment, the local device may perform two separate authentications, one for the user's identity, and one for the user's access. This may involve the key card having two separate public/private key pairs, one for their identity, and one for their access. In this embodiment, the local device may receive an ID from the key card reader, use the ID to determine the card's public keys, and generate two random numbers that will be encrypted into challenges using the key card's public keys. It may then send the two challenge/response pairs to the key card reader, which may then authenticate the key card separately for its identity and its access to the guarded asset.

In some embodiments involving two separate authentications with two separate private keys, one for identity and another for access, the local device may use the same expected response for both challenge/response pairs, thus further reducing the length of the communication to send over the shared data bus.

In some embodiments, if the identity or access authentication is negative, the key card reader may be configured to send a request to the local device to update its memory using information in up-to-date sources. For example, the local device may be configured to request, from the identity and access servers, the most up-to-date information about identity and access. If the up-to-date information is different from the information used to deny access to the key card holder, the local device may genera new challenge/response pairs and send them to the key card reader to repeat the authentication process. Thus, if a new user or a user with new access presents their card because the local device's memory is updated, the local device may update its memory itself and provide correct access to the user.

In some embodiments, the local device may be configured to alert an administrator, local authorities or other personnel to unsuccessful attempts. This alert may be issued on every unsuccessful access attempt, after a predetermined number of unsuccessful access attempts by a particular key card (whether at one particular access point or across multiple access points), after a predetermined number of unsuccessful access attempts using multiple different cards at a common access point or at a group of nearby access points, or in any other suitable scenario.

In some embodiments, the local device may be configured to keep, in its memory, information about all authentication attempts (successful and unsuccessful) and all related information (such as time, date, card ID, key card reader location, etc.) having occurred within a predetermined time period (e.g., the preceding 24 hours, the preceding 7 days, the preceding 30 days, etc.) so that an administrator can review which card users are accessing which assets.

In some embodiments, an administrator may be able to access the local device 15 to edit identity or access privileges.

Figure 4:
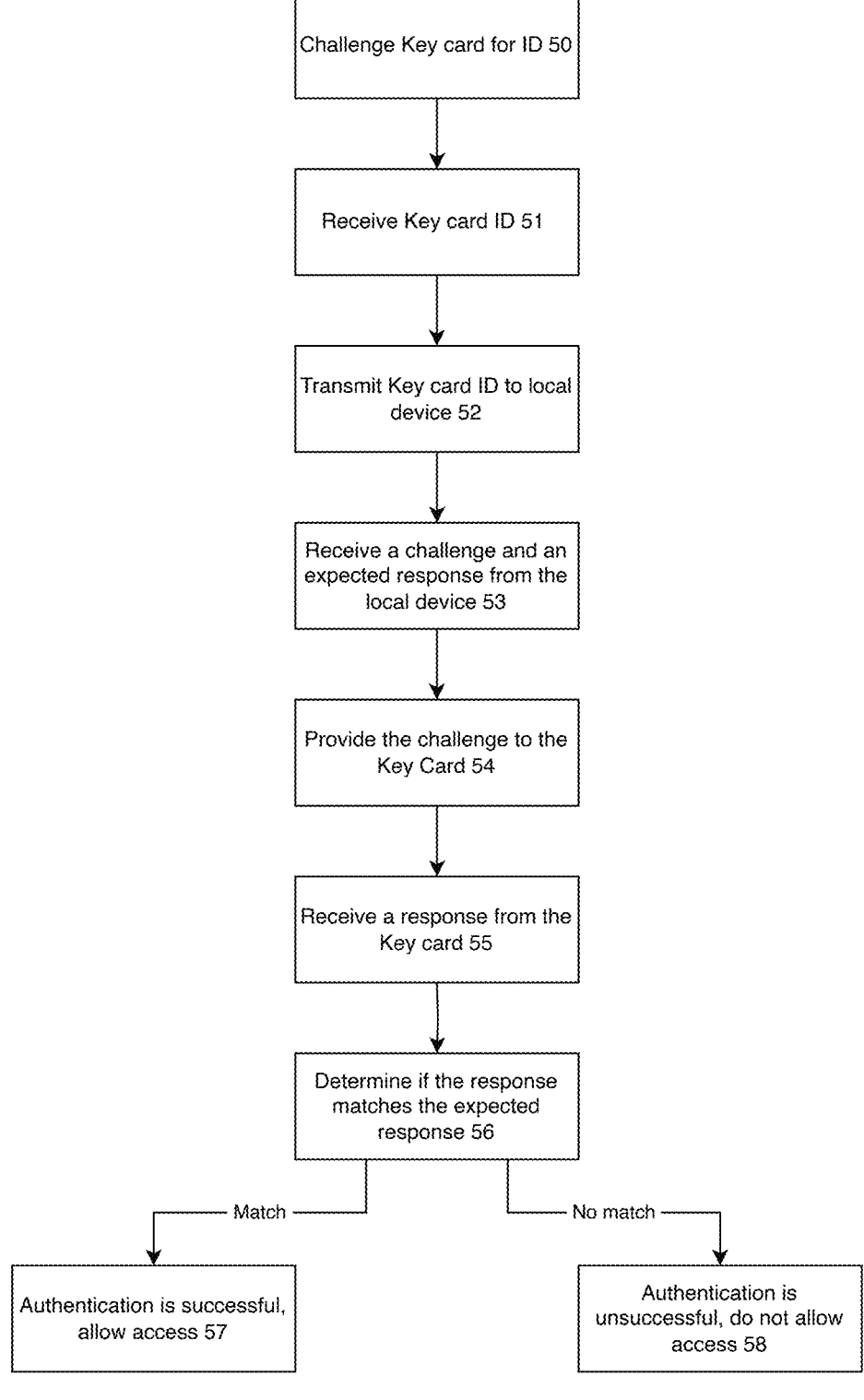
FIG. 4 is a flowchart describing the functionality of the improved smart card reader in a first embodiment.

FIG. 4 is a flowchart describing the functionality of the improved smart card reader in a first embodiment. The key card reader may first request a nearby key card for its ID 50. The key card reader may then receive the ID of the card 51, and then transmit the card ID to a local device 52 over a shared data bus network with limited bandwidth. The key card reader may then receive a challenge/response pair, comprising a challenge and an expected response, from the local device 53. The key card reader may then provide the challenge to the key card 54, and receive a response from the key card 55, and determine whether the response matches the expected response 56. If the response matches the expected response, the authentication is successful and the key card reader may allow access to the guarded asset 57. This may involve sending a signal to an actuator that will perform an operation to render the guarded asset available to the card holder (e.g., unlocking a door, granting access to a computer account, etc.). If the response does not match the expected response, the authentication is unsuccessful and the key card reader may deny access to the guarded asset 58.

Figure 5:
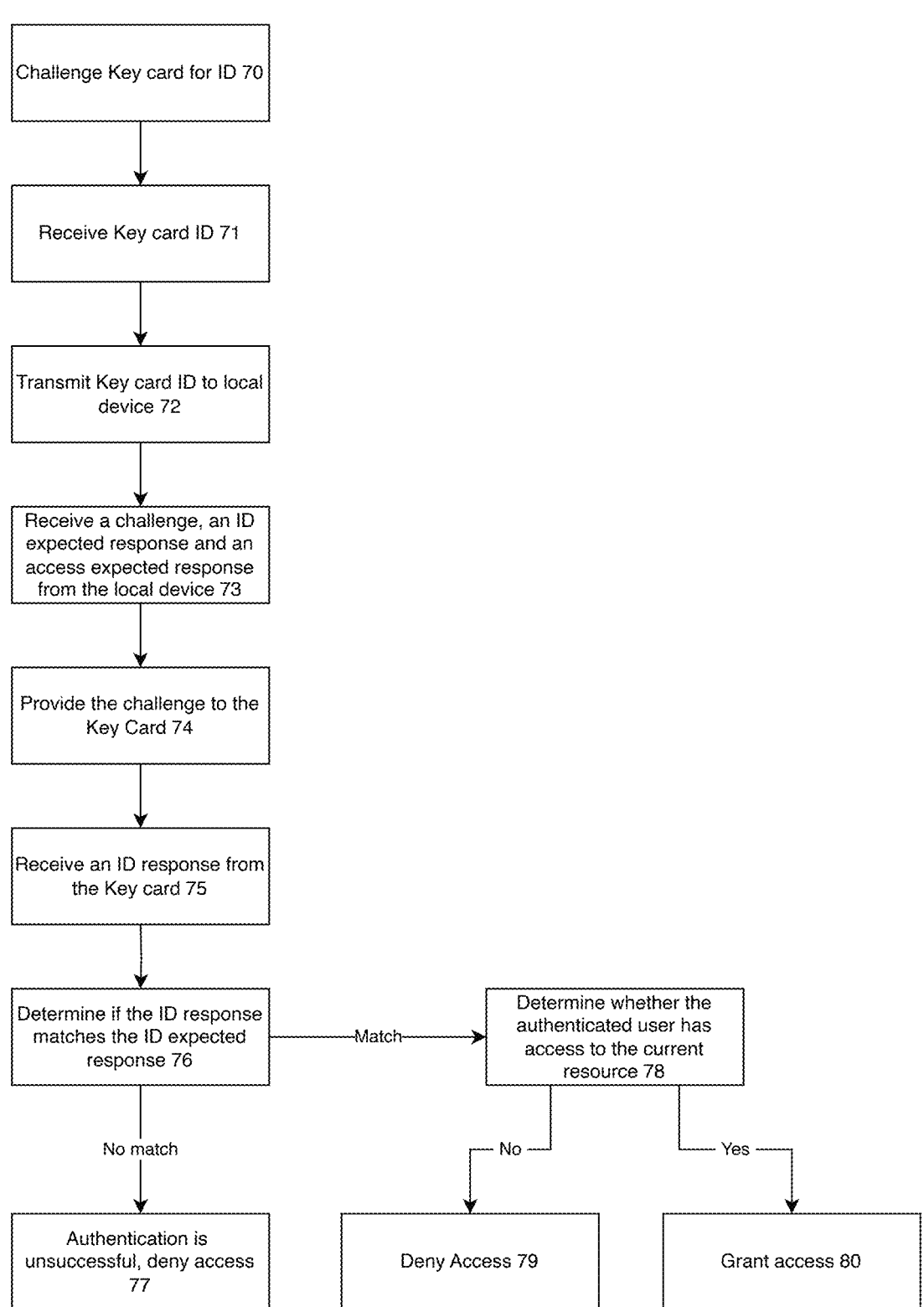
FIG. 5 is a flowchart describing the functionality of the improved smart card reader in a second embodiment.

FIG. 5 is a flowchart describing the functionality of the improved smart card reader in a second embodiment. The key card reader may first request a nearby key card for its ID 70. The key card reader may then receive the ID of the card 71, and then transmit the card ID to a local device 72 over a shared data bus network with limited bandwidth. The key card reader may then receive a challenge/response pair, comprising a challenge and an expected response, from the local device 73. The key card reader may then provide the challenge to the key card 74, and receive a response from the key card 75, and determine whether the response matches the expected response 76. If the response does not match the expected response, the authentication is unsuccessful and the key card reader may deny access to the guarded asset 77. If the response matches the expected response, the authentication is successful and the key card reader may then determine whether the authenticated user has access to the resource 78. If the result of the determination that the user has access is negative, the key card reader may deny access 79.

The determination of whether the authenticated user has access to a resource may be done in various ways. In some embodiments, the local device may check if the card associated with the received ID is allowed access, and thus provide the key card reader at step 73 with an indicator of whether access is allowed or not. Alternatively, the key card reader at step 78 may inform the local device that identity authentication is successful, and request a determination from local device as to whether the card holder has access. Alternatively, the key card reader at step 78 may request the local device for another challenge/response pair to challenge the key card with to determine if it has access, or, if the second challenge/response pair was already provided by the local device at step 73, the key card reader may challenge the key card to determine if it has access. Various other ways are possible.

Figure 6:
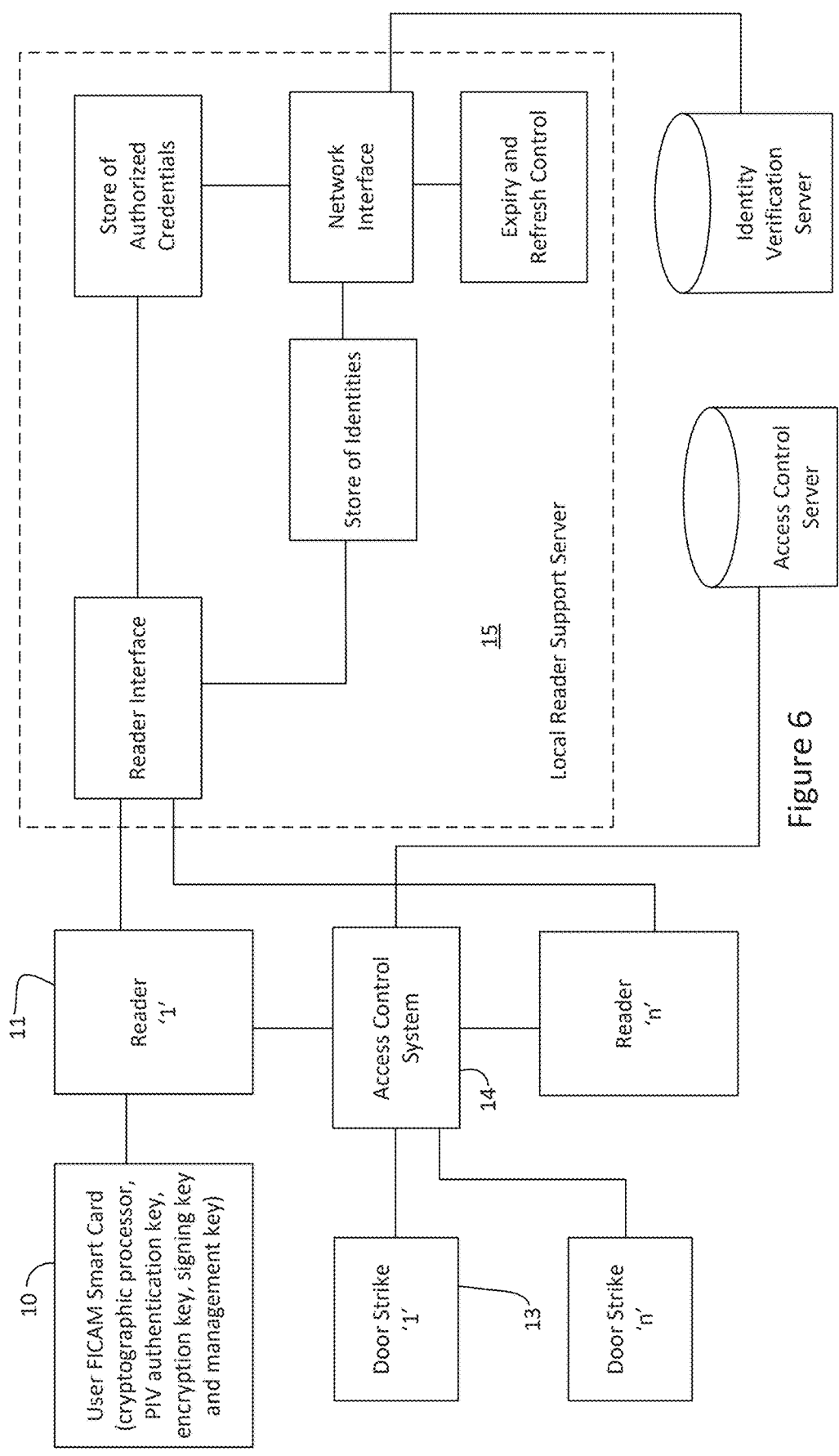
FIG. 6 is a block diagram of an example of an access control system in which a local server is used to maintain certificates associated with access cards with card readers using the local server storage of certificates to authenticate access cards.

In the example of FIG. 6, the local device 15 acts as a local reader support server and is responsible for maintaining a local store of the certificates that the readers may require. This may allow for a reader to operate with reduced memory requirements and reduce the communication bandwidth requirements for each reader 11, and may additionally simplify the task of ensuring that the certificates accessed by the reader are valid. However, the readers in FIG. 6 may use a greater bandwidth connection to device 15 than in the examples given above. The readers 11 in FIG. 6 may also have the processing power to process challenges and responses without compromising response time.

As illustrated, the local device 15 can access trusted servers to obtain certificates associated with smart cards for identity purposes and for access control purposes including obtaining updates when a certificate is revoked or added. An expiry and refresh control module may also ensure that each certificate stored has not expired. Typically, only unexpired and valid certificates are provided to readers in response to a request for a certificate related to a given card.

The readers 11 may be connected directly to actuators 13 or indirectly to actuators 13 through an access control system 14. The reader 11 may also pass on to the access control system 14 authorization validation following authentication. This can represent a two-stage process of authentication (for example, done at the reader) then authorization for access control (for example done at system 14). System 14 can communicate with an access control server that maintains certificates associated with the authorized users for access control. The access control system 14 can be integrated into the local server 15 if desired.

Figure 7:
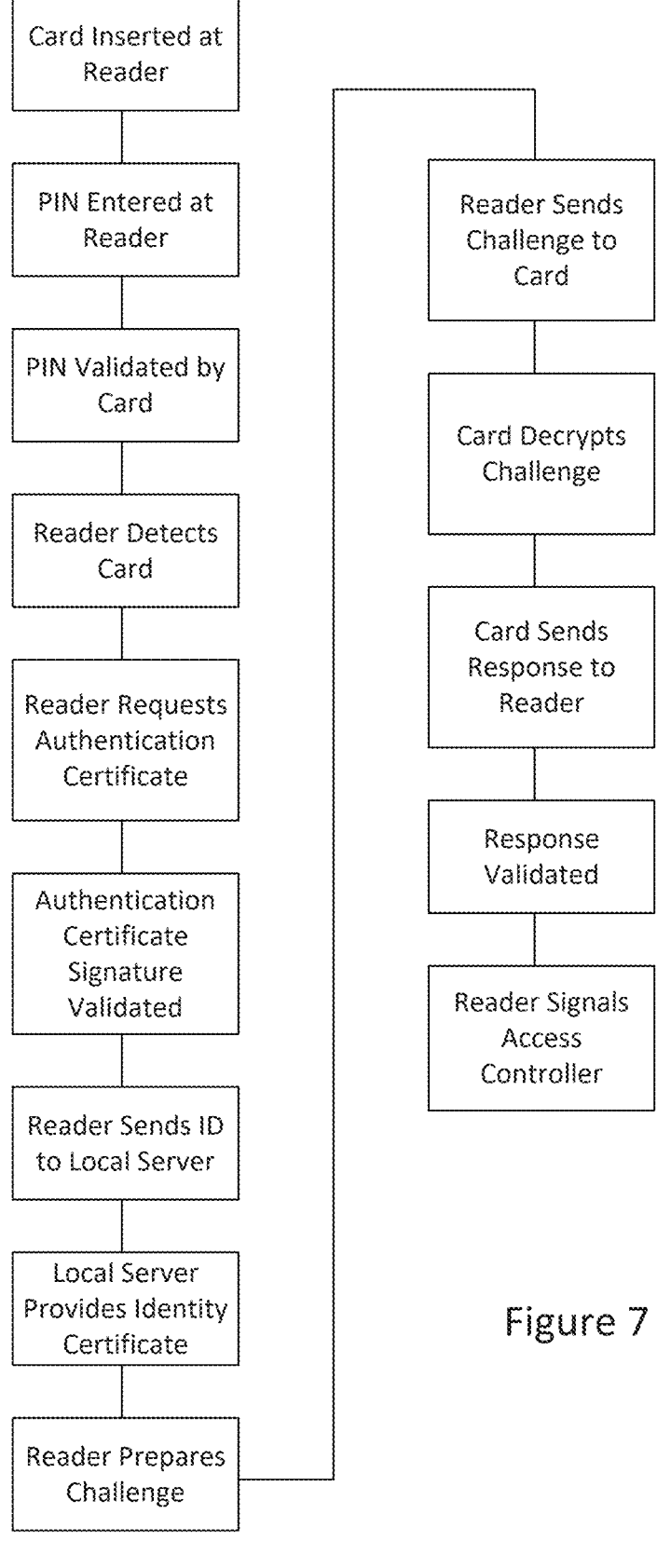
FIG. 7 is a flow diagram illustrating an example of the steps in one type of authentication.

In the flow diagram of FIG. 7, an example of PKI-AUTH two-factor authentication is provided. In the first step, a card 10 is presented to the reader 11. In this example, the reader 11 is equipped with a PIN keypad and the card is inserted into reader 11. The reader will then prompt the user to enter the PIN at the keypad. The PIN is received by the card 10 and the card validates the PIN. The card 10 is then enabled for communication with the reader 10.

In the next step, the reader requests the card 10 for its authentication certificate. This certificate is a signed certificate using a trusted key. The reader 11 may then validate the signature and confirm that the card is not expired. In the example of FIG. 7, the reader 11 sends an identifier to the local server 15 to obtain an identity certificate. The reader 11 receives the certificate (or, sometimes, merely the public key of the card to be authenticated) and can prepare a challenge. This typically involves generating a random value and encrypting it with the certificate. The reader 11 can then send the challenge to the card 10 so that the card can decrypt the challenge using its private key. This allows for the reader 11 to authenticate the card 10 when the card returns the random value. The reader 11 can then send a signal to the door actuator 13 or to a controller 14 that will then send a control signal to the actuator 13.

Although the invention has been described with reference to preferred embodiments, it is to be understood that modifications may be resorted to as will be apparent to those skilled in the art. Such modifications and variations are to be considered within the purview and scope of the present invention.

Representative, non-limiting examples of the present invention were described above in detail with reference to the attached drawing. This detailed description is merely intended to teach a person of skill in the art further details for practicing preferred aspects of the present teachings and is not intended to limit the scope of the invention. Furthermore, each of the additional features and teachings disclosed above and below may be utilized separately or in conjunction with other features and teachings.

Moreover, combinations of features and steps disclosed in the above detailed description, as well as in the experimental examples, may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

What is claimed is:

1. A key card reader comprising:
   a. a card communications interface;
   b. a network communication interface;
   c. a memory; and
   d. a processor operatively connected to said memory, said processor configured to:
      i. receive from said card communications interface an identifier of a key card to be authenticated;
      ii. transmit the identifier to a local device over said network communications interface;
      iii. receive, over the network communications interface, a challenge/expected response pair specific to the key card to be authenticated, and from that pair identify a challenge and an expected response;
      iv. transmit the challenge to the key card over said card communications interface;
      v. receive a response from the key card over said card communications interface;
      vi. determine whether the response corresponds to the expected response; and
      vii. sending a signal to an actuator to grant access to a guarded asset on the basis of the response being equal/equivalent/corresponding to the expected response and of an entity associated with the key card being found to have access to the guarded asset.

2. The card reader of claim 1, wherein the network communication interface is a shared data bus interface.

3. The card reader of claim 1, further comprising a number pad, and the processor being additionally configured to receive a code from the number pad, to transmit the code to the card to be authenticated, and in response to the transmission of the code to receive the identifier of the key card to be identified.

4. The card reader of claim 1, wherein the processor is further configured to communicate with an access control system to find whether an entity associated with the key card has access to the guarded asset.

5. A key card authentication system, the system comprising:
   a. at least one key card reader; and
   b. a local device, comprising information for determining a public key of a key card based on an identifier of a key card;
   c. wherein the at least one key card reader are each configured to:
      i. receive an identifier of a key card to be authenticated;
      ii. transmit, via the network communications interface, the ID of the key card to be authenticated to a local device;
      iii. receive, via network communications interface, a challenge/expected response pair, and from that pair identify a challenge and an expected response;
      iv. transmit the challenge to the key card;
      v. receive a response from the key card; and
      vi. determine whether the response is equal to the expected response;
   d. wherein the local device is configured to:
      i. receive, via the network communications interface, the identifier of the key card to be authenticated;
      ii. determine a public key of the key card to be authenticated based on the ID of the key card to be authenticated;
      iii. generate a random sequence;
      iv. encrypt the random sequence, generating an encrypted random sequence, using the public key of the key card to be authenticated to generate a challenge; and
      v. transmit, via the network communications interface, a challenge/expected response pair to the key card reader, wherein the challenge is the encrypted random sequence and the expected response is the random sequence;
   e. wherein the identifier of a key card is significantly smaller in size than the public key of a key card.

6. The key card authentication system of claim 5, further comprising a shared data bus for connecting all of the at least one key card reader to the local device.

7. The key card authentication system of claim 5, wherein the at least one key card reader is further configured to receive an external factor of authentication from an entity holding the key card to be authenticated and transmit the factor of authentication to the card for validation before receiving the identifier from the card.

8. The key card authentication system of claim 5, wherein the key card reader is further configured to, if the response is equal to the expected response, determine whether an entity associated with the card to be authenticated has access to a guarded asset.

9. The key card authentication system of claim 5, wherein at least one of the key card reader or the local device is further configured to record all communications in the system.

10. The key card authentication system of claim 5, wherein the local device is further configured to, prior to generating the random sequence, determine whether the card to be authenticated is expired.

11. A method of authenticating key cards, the method comprising:
   a. receiving, at a key card reader, an identifier of a key card presented to the key card reader for authentication;

b. transmitting, from the key card reader, the identifier to a local device;

c. determining, at the local device, the public key of the key card based on the identifier;

d. generating, at the local device, a random sequence;

e. generating, at the local device, a challenge/expected response pair, the challenge being the random sequence encrypted using the public key, and the expected response being the random sequence;

f. transmitting, from the local device, the challenge/expected response pair to the key card reader;

g. transmitting, from the key card reader to the key card, the challenge;

h. receiving, at the key card reader, a response from the key card; and i. determining whether the response matches the expected response.

12. The method of claim 11, wherein the communications between the key card reader and the local device occur over a shared data bus.

13. The method of claim 11, wherein steps a to g are authenticating an identity, and the method further comprises determining whether the authenticated user has access.

14. The method of claim 11, further comprising communicating to the local device the success or failure of the authentication.

15. A backend key card security device, comprising:

a. a memory containing at least identifier, public key, private key and access information of all security cards in a security network;

b. a network interface connected for receiving and sending information from and to a number of security card readers; and c. a processor, configured to:

i. receive an identifier of a security card to be authenticated from a security card reader;

ii. determine a public key associated with the identifier stored in the memory;

iii. generate a random sequence, the random sequence forming an expected response;

iv. encrypt the random sequence using the public key associated with the identifier, forming a challenge, the challenge and expected response forming a challenge/response pair; and v. send the challenge/response pair, as one communication, to the security card reader.

16. The backend key card security device of claim 15, wherein the network interface is a shared data bus interface, and the information provided to and from the number of security card readers is transmitted over the shared data bus.

17. The device of claim 15, wherein the device is further connected to an identifier database and an access database, and wherein the processor is configured to determine, in response to a communication from the security card reader that authentication is successful, using information in the access database, whether the security card to be authenticated has access to a guarded asset, and sends the result of the determination to the security card reader.

18. A key card reader comprising:

a. a card communications interface;

b. a data interface;

c. a memory; and d. a processor operatively connected to said memory, said processor configured to:

i. receive from said card communications interface an identifier of a key card to be authenticated;

ii. transmit the identifier to a local device over said data interface;

iii. receive, from the data interface, a certificate corresponding to said card;

iv. prepare a challenge using said certificate;

v. send said challenge to said key card over said data interface;

vi. receive a response from said key card;

vii. determine whether the response corresponds to an expected response; and viii. communicate with an access controller for access control authorization when the response corresponds to the expected response.

19. The key card reader of claim 18, wherein said access controller is an access control system, said processor being further configured to:

handle access authorization communication with said key card using an access control certificate received from said access control system.

20. The key card reader of claim 19, wherein said access control system is implemented at least in part by the local device.

* * * * *